United States Patent Office 3,506,636
Patented Apr. 14, 1970

3,506,636
PROCESS FOR SHORT-STOPPING CHLOROPRENE POLYMERIZATION WITH NITRIC OXIDE
Alan Charles Sturt, Surrey, England, assignor to The Distillers Company Limited, Edinburgh, Scotland, a British company
No Drawing. Filed Nov. 1, 1966, Ser. No. 591,081
Claims priority, application Great Britain, Nov. 17, 1965, 48,818/65, Patent 1,090,484
Int. Cl. C08d 3/14; C08f 3/20
U.S. Cl. 260—92.3                     7 Claims

ABSTRACT OF THE DISCLOSURE

Chloroprene polymers are produced by polymerizing 2-chloro-1,3-butadiene or 2-chloro-1,3-butadiene having no more than 20% by weight based on the total weight of monomeric material of a copolymerizable monomer or more than one monomer in an aqueous emulsion system and stopping the polymerization while the emulsion contains unpolymerized 2-chloro-1,3-butadiene by contacting the emulsion in the absence of oxygen with a short stop agent which comprises nitric oxide.

---

The present invention is concerned with improvements in or relating to a process for making chloroprene polymers and to the polymer formed by the process.

It is known that it is necessary to stop the polymerisation of 2-chlor-1,3-butadiene before all the monomer has polymerised in order to obtain commercially useful products. To stop the polymerisation it is customary to add a "short stop" agent to the reaction mixture when the desired proportion of monomer has polymerised.

The "short stop" agents generally used are not entirely satisfactory. For example some are not completely effective in the proportions which it is practical to use and the higher the temperature the less effective they become; thus rapid cooling of the reaction mixture after addition of the "short stop" agent is necessary. The majority of "short stop" agents e.g. tertiary butyl catechol, phenothiazine, hydroquinone, and water soluble dithiocarbamate salts tend to discolour the polymer since they are either coloured or tend to form coloured derivatives. They can in consequence be used only in limited amounts. Many are antioxidants which require the presence of oxygen to function efficiently and oxygen is undesirable in a reaction mixture containing unpolymerised chloroprene. Furthermore, the polymer when isolated may contain traces of residual "short stop" agents which may cause deterioration of its properties.

It is an object of the present invention to provide an improved process for making chloroprene polymers involving the use of a "short stop" agent or agents.

The process for making chloroprene polymers according to the present invention comprises polymerising 2-chloro-1,3-butadiene or 2-chloro-1,3-butadiene and no more than 20 percent by weight based on the total weight of monomeric material of a copolymerisable monomer or monomers in an aqueous emulsion system and stopping the polymerisation while the emulsion contains unpolymerised 2-chloro-1,3-butadiene by contacting the emulsion in the absence of oxygen with a "short stop" agent comprising nitric oxide.

The copolymerisable monomer can be any monomer containing ethylene unsaturation capable of undergoing addition polymerisation with 2-chloro-1,3-butadiene. Some examples are styrene, acrylonitrile and 2,3-dichloro-1,3-butadiene.

The polymerisation of 2-chloro-1,3-butadiene in aqueous emulsion systems is well known and any such system can be employed. Any conventional emulsifying agents may be used in making the emulsion. These agents include the sodium, potassium or ammonium salts of long chain fatty acids; salts of rosins and rosin derivatives such as wood rosin, disproportionated rosin or hydrogenated rosin; higher alcohol sulphates; aryl sulphonic acids and formaldehyde condensates of aryl sulphonic acids and their salts. Some examples are the potassium salt of a disproportionated rosin acid, the sodium salt of a condensate of formaldehyde and naphthalene sulphonic acid, and nonyl benzene sulphonic acid.

Conventional modifying agents can be present such as for example sulphur, an aliphatic mercaptan, or a dialkyl xanthogen disulphide.

Any polymerisation initiator capable of initiating polymerisation of 2-chloro-1,3-butadiene by way of free radical mechanisms can form part of the aqueous emulsion system. An example of a group of this type of initiator are the organic and inorganic peroxides. Some inorganic peroxides are hydrogen peroxide or the water soluble salts of inorganic peracids such as the persulphates, perborates or percarbonates. The ammonium or alkali metal persulphates are preferred. Some examples of organic peroxides are aryl peroxides such as cumene hydroperoxide. Redox initiating systems such as a peroxide or peracid salt and a reducing agent may be employed. The initiator is usually added to the emulsion system during polymerisation at such a rate that the desired rate of polymerisation is maintained. The rate of polymerisation can be determined by measuring the specific gravity of the emulsion during the polymerisation.

The pH of the emulsion system may be slightly acidic, neutral or in the alkaline range. It is preferred to conduct the polymerisation at a pH in the range 7 to 13.5.

The polymerisation can be and usually is carried out using known techniques in which oxygen is excluded from the atmosphere in the polymerisation vessel. This is conveniently done by sweeping the vessel with a stream of inert gas such as nitrogen and maintaining an atmosphere of nitrogen above the aqueous emulsion during polymerisation. The polymerisation is preferably carried out at normal polymerisation temperature, i.e. in the range 5° C. to 90° C.

The polymerisation is stopped with a "short stop" agent comprising nitric oxide. Nitric oxide can be the only "short stop" agent or it can be used in conjunction with one or more other "short stop" agents. Any other "short stop" agent can be used in conjunction with the nitric oxide. Some examples of these other agents have already been described.

The amount of nitric oxide required to stop polymerisation is dependent on the polymerisation initiator system and the reaction conditions.

The polymerisation takes place because of the formation of free radicals in the system. The amount of nitric oxide should be sufficient to prevent these radicals from causing polymerisation to take place. The minimum amount necessary to achieve this result will vary from system to system and depend upon such factors as polymerisation temperature, temperature of the system after addition of the "short stop" agent, reactivity of comonomer if one is used and type of polymerisation initiator, its concentration and method of addition to the system. Conveniently the minimum amount can be determined empirically for each system. In practice for most systems this minimum will lie in the range from about 1 to 500 parts per million by weight on monomer charged. The upper limit is dictated principally by economic considerations. Amounts as little as about 0.5 parts per million by weight of nitric oxide in relation to the weight of 2-chloro-1,3-butadiene charged can be used in conjunction with another "short stop" agent. Where nitric oxide is the only "short stop" agent a preferred range is 5 to 500 parts per million by weight in relation to the weight of 2-chloro-1,3-butadiene initially present in the aqueous emulsion system.

Since polymerisation is normally carried out in the absence of oxygen there is usually no necessity to take special measures to eliminate oxygen before contacting the emulsion with nitric oxide in order to prevent the formation of nitrogen dioxide. The nitric oxide can conveniently be added to the gas phase above the aqueous emulsion system.

The polymerisation can be stopped when the desired proportion of 2-chloro-1,3-butadiene has polymerised. This proportion may be varied widely according to the nature of the rubber desired. Most suitably the polymerisation is stopped when the emulsion contains between 5 to 40 percent by weight of unpolymerised 2-chloro-1,3-butadiene in relation to the weight of 2-chloro - 1,3 - butadiene charged.

The short stopping step of the process according to the invention can be carried out at the normal polymerisation temperatures i.e. in the range 5° C. to 90° C. without cooling the aqueous polymer emulsion.

The nitric oxide can be removed from the emulsion when unreacted monomer is stripped from the latex.

The process according to the present invention gives rubbers which are not discoloured and rubbers free from residual "short stop" agent are readily obtained.

The following examples illustrate the process according to the present invention.

EXAMPLE 1

The following recipe was used to prepare a mercaptan modified polychloroprene:

Chloroprene—1300 grams
2:6 di-tertiary butyl para cresol—0.5 gram
Distilled water—1615 mls.
Potassium salt of disproportionated rosin acid (80% active)—64.0 grams
Sodium salt of a condensation product of formaldehyde and naphthalene sulphonic acid—9.1 grams
Sodium hydroxide (5% w./v.)—26 mls.
n-Dodecyl mercaptan (98% pure)—2.70 grams The aqueous phase was charged into the reactor, degassed to remove oxygen and kept under a nitrogen blanket under which the whole reaction took place. The mercaptan was then added to the aqueous phase. The chloroprene was freshly steam-distilled under nitrogen into a receiver containing the 2:6 ditertiary butyl para cresol, which dissolved immediately. This chloroprene solution was added to the aqueous phase in the reactor, and the batch was heated with stirring to 45° C., at which temperature the polymerisation was initiated by adding 10 mls. of a catalyst solution made up as follows:

Potassium persulphate—0.200 grams
Sodium 2-anthraquinone sulphonate—0.015 grams
Distilled water—200 mls.

After adding the initial dose, the catalyst was pumped to the reactor at a fixed rate of 9 mls./hr. After eight hours 65% of the monomer had polymerised and "short stopping" was effected by injecting 10 mls. of nitric oxide into the gas phase above the aqueous emulsion system. The amount of nitric oxide added corresponded to about 10 p.p.m. by weight of chloroprene initially charged. At this point catalyst feed was stopped but the temperature was maintained at 45° C. for a further five hours to see whether polymerisation would continue. No further polymerisation occurred during the five hours after the nitric oxide had been injected into the gas phase above the polymerisation charge.

The polymer which was isolated from this latex was not discoloured in any way.

EXAMPLE 2

A sulphur modified polychloroprene was prepared with the following recipe:

Chloroprene—1200 grams
2:6 ditertiary butyl para cresol—0.5 grams
Disproportionated rosin acid—48.0 grams
Sulphur—4.5 grams
Distilled water—1750 mls.
Sodium hydroxide—5.7 grams
Trisodium phosphate hydrate—8.5 grams
Sodium salt of a condensation product of formaldehyde and naphthalene sulphonic acid—9.0 grams The aqueous phase was charged into a reactor, degassed to remove oxygen and kept under nitrogen blanket under which the whole reaction took place. The chloroprene was freshly steam distilled into a receiver containing the 2:6 ditertiary butyl para cresol which dissolved immediately. The rosin acid and sulphur were dissolved in the chloroprene solution which was then charged into the reactor containing the aqueous phase. The charge was heated with stirring to 40° C. at which polymerisation was initiated by adding 10 mls. of catalyst solution made as follows:

Potassium persulphate—1.5 grams
Sodium 2-anthraquinone sulphonate—0.10 grams
Distilled water—200 mls.

After adding the initial dose, the catalyst solution was pumped into the reactor at a fixed rate of 9 mls./hour. When 63 percent of the monomer had polymerised (after 3 hours 10 minutes) the catalyst feed was stopped and 100 mls. of nitric oxide were injected into the gas phase above the polymerising charge. The temperature was maintained at 40° C. for a further 4½ hours during which no further polymerisation occurred. The nitric oxide which had been added corresponded to about 105 p.p.m. by weight of monomer initially charged.

The polymer isolated from this polymerisation was not discoloured.

I claim:

1. A process for the production of chloroprene polymers by free-radical polymerisation which comprises polymerising 2-chloro-1,3-butadiene or 2-chloro-1,3-butadiene and no more than 20 percent by weight based on the total weight of monomeric material of at least one copolymerisable monomer and a pH of from 7 to 13.5 in an aqueous emulsion system and stopping the polymerisation while the emulsion contains unpolymerised 2-chloro-1,3-butadiene by contacting the emulsion in the absence of oxygen with a "short stop" agent the essential component of which is nitric oxide.

2. A process as claimed in claim 1 wherein 1 to 500 parts per million by weight of nitric oxide is added in relation to the weight of 2-chloro-1,3-butadiene charged.

3. A process as claimed in claim 1 wherein the nitric oxide is added to the gas phase above the aqueous emulsion system.

4. A process as claimed in claim 1 wherein the polymerisation is stopped while the emulsion contains between 5 to 40 percent by weight of unpolymerised 2-chloro-1,3-butadiene in relation to the weight of 2-chloro-1,3-butadiene charged.

5. A process as claimed in claim 1 wherein the "short stop" agent comprises nitric oxide in conjunction with at least one other "short stop" agent.

6. A process as claimed in claim 5 wherein at least 0.5 part per million by weight of nitric oxide is added in relation to the weight of 2-chloro-1,3-butadiene charged.

7. A process for the production of chloroprene polymers which comprises polymerising 2-chloro-1,3-butadiene or 2-chloro-1,3-butadiene and not more than 20 percent by weight based on the total weight of monomeric material of at least one copolymerisable monomer and a pH of from 7 to 13.5 in the aqueous emulsion system and stopping the polymerisation while the emulsion contains between 5 and 40 percent by weight of unpolymerised 2-chloro-1,3-butadiene in relation to the weight of 2-chloro-1,3-butadiene charged by contacting the emulsion in the absence of oxygen with a "short stop" agent the essential component of which is 1 to 500 parts per million by weight of nitric oxide in relation to the weight of 2-chloro-1,3-butadiene charged.

References Cited

UNITED STATES PATENTS

| | | | |
|---|---|---|---|
| 2,803,623 | 8/1957 | Anderson | 260—92.3 XR |
| 3,231,556 | 1/1966 | Hutchinson | 260—92.3 |

OTHER REFERENCES

Polymerization—Stopping Agents by Antlfinger and Lufter, vol. 45, No. 1—Industrial and Engineering Chemistry, pp. 182–185.

JOSEPH L. SCHOFER, Primary Examiner

W. F. HAMROCK, Assistant Examiner

U.S. Cl. X.R.

260—82.1, 83.3, 85.1